(12) United States Patent
Stenfort

(10) Patent No.: US 7,376,759 B1
(45) Date of Patent: May 20, 2008

(54) APPARATUS FOR PERFORMING DEVICE COMMUNICATION AND METHOD FOR OPERATING THE SAME

(75) Inventor: Ross Stenfort, San Jose, CA (US)

(73) Assignee: Adaptec, Inc., Milpitas, CA (US)

( * ) Notice: Subject to any disclaimer, the term of this patent is extended or adjusted under 35 U.S.C. 154(b) by 817 days.

(21) Appl. No.: 10/782,249

(22) Filed: Feb. 18, 2004

(51) Int. Cl.
*G06F 3/00* (2006.01)
*G06F 9/46* (2006.01)
*G03F 7/38* (2006.01)

(52) U.S. Cl. ............... 710/7; 710/5; 710/20; 718/103; 326/46

(58) Field of Classification Search ............ 710/15, 710/260–266
See application file for complete search history.

(56) References Cited

U.S. PATENT DOCUMENTS 5,752,031 A * 5/1998 Cutler et al. ............... 718/103
6,243,736 B1 * 6/2001 Diepstraten et al. ........ 718/108
6,961,813 B2 * 11/2005 Grieff et al. ............... 711/112

OTHER PUBLICATIONS

Yingxu Wang and Cyprian F. Ngolah, Formal Description of a Real-Time Operating System using RTPA, May 2003, CCECE, IEEE.*

Defintion of SATA as define by: http://www.techweb.com, accessed Jul. 12, 2007 □□http://www.techweb.com/encyclopedia/printArticlePage.jhtml?term=SATA.*

* cited by examiner

*Primary Examiner*—Alford Kindred
*Assistant Examiner*—Jonathan R Plante
(74) *Attorney, Agent, or Firm*—Martine Penilla & Gencarella, LLP

(57) ABSTRACT

An apparatus and an associated method of operation is provided for performing device communication in accordance with a standard protocol, while enabling deviation from the device communication without termination or corruption of the device communication. The apparatus incorporates a pair of state machines configured to provide standard protocol communication with interrupt capability. A first state machine functions to perform the communication process in accordance with the standard protocol. The first state machine is also configured to deviate from the communication process in order to perform another requested task. A second state machine functions to monitor the communication process being performed by the first state machine. Upon completion of the other requested task by the first state machine, a state of the communication process is provided by the second state machine to enable the communication process to be continued by the first state machine.

17 Claims, 4 Drawing Sheets

APPARATUS FOR PERFORMING DEVICE COMMUNICATION AND METHOD FOR OPERATING THE SAME

BACKGROUND OF THE INVENTION

1. Field of the Invention

The present invention relates generally to electronic device communication.

2. Description of the Related Art

Modern computing systems generally include a number of devices in communication with each other. For example, one device may be a host computer and another device may be a hard drive connected as a peripheral device. Communication (i.e., data transfer) protocols, such as IDE and SCSI, are used to enable communication between the devices. Standard communication protocols have been developed to ensure communication compatibility between various devices. The standard communication protocols provide rigid frameworks and processes for conducting data transfers between devices. For example, Serial AT Attachment (SATA) represents a standard protocol used for communication to and from an internal storage device.

Most standard communication protocols, such as SATA, are interlocked protocols that follow a distinct series of events. Since the distinct series of events occur essentially in real-time, the functionality required to implement the standard communication protocol is typically provided in a hardware state machine. Currently available hardware state machines for implementing the standard communication protocols do not provide for deviation from the standard communication protocol framework and processes. Thus, once a communication sequence is initiated with the currently available hardware state machines, the communication sequence is required to continue without interruption until the communication sequence is successfully completed. Otherwise, the communication sequence will fail.

In view of the foregoing, there is a need for an apparatus that is capable of performing a device communication process in accordance with a standard protocol, while also allowing for deviation from and return to the device communication process.

SUMMARY OF THE INVENTION

Broadly speaking an apparatus and an associated method of operation is disclosed for performing device communication. More specifically, the present invention provides an apparatus and an associated method of operation for performing device communication in accordance with a standard protocol, while enabling deviation from the device communication without termination or corruption of the device communication. The apparatus of the present invention incorporates a pair of state machines configured to provide standard protocol communication with interrupt capability. A first state machine of the pair of state machines functions to perform the communication process in accordance with the standard protocol. The first state machine is also configured to deviate from the communication process in order to perform another requested task, such as a task having a higher priority relative to the communication process. A second state machine of the pair of state machines functions to monitor the communication process being performed by the first state machine. Thus, upon completion of the other requested task by the first state machine, a state of the communication process as represented by the second state machine can be referenced as the state from which the communication process should be continued by the first state machine.

In one embodiment, a circuit for performing device communication is disclosed. The circuit includes a first state machine defined by circuitry configured to perform device communication in accordance with a standard protocol. The first state machine circuitry is also configured to enable deviation from the device communication. Additionally, the first state machine circuitry is configured to obtain a status of the device communication to enable a continuation of the device communication. The circuit also includes a second state machine defined by circuitry configured to monitor the device communication to be performed by the first state machine. The second state machine circuitry is also configured to provide the status of the device communication to the first state machine, thus enabling continuation of the device communication by the first state machine.

In another embodiment, a method for performing device communication is disclosed. The method includes operating a first state machine to perform a frame transfer operation. A second state machine is also operated to monitor a status of the frame transfer operation being performed by the first state machine. The method further includes operating the first state machine to perform a task other that the frame transfer operation. The first state machine deviates from the frame transfer operation to perform the other task. The method also calls for referral to the second state machine to determine a current state of the frame transfer operation. The method follows by having the first state machine operate to continue the frame transfer operation from the current state as determined by referring to the second state machine.

In another embodiment, a computer readable media containing program instructions for performing device communication is disclosed. The computer readable media includes program instructions for operating a first state machine to perform a frame transfer operation. Program instructions are also provided for operating a second state machine to monitor a status of the frame transfer operation being performed by the first state machine. Program instructions are further provided for operating the first state machine to perform a task other that the frame transfer operation, wherein the first state machine deviates from the frame transfer operation to perform the other task. Additionally, the computer readable media includes program instructions for referring to the second state machine to determine a current state of the frame transfer operation, and program instructions for operating the first state machine to continue the frame transfer operation from the current state.

Other aspects of the invention will become more apparent from the following detailed description, taken in conjunction with the accompanying drawings, illustrating by way of example the present invention.

BRIEF DESCRIPTION OF THE DRAWINGS

The invention, together with further advantages thereof, may best be understood by reference to the following description taken in conjunction with the accompanying drawings in which.

DETAILED DESCRIPTION

The present invention provides an apparatus and an associated method of operation for performing device communication in accordance with a standard protocol, while enabling deviation of the device communication without termination or corruption of the device communication. More specifically, the apparatus of the present invention incorporates a pair of state machines configured to provide standard protocol communication with interrupt capability. A first state machine of the pair of state machines functions to perform the communication process in accordance with the standard protocol. The first state machine is also configured to deviate from the communication process in order to perform another requested task, such as a task having a higher priority relative to the communication process. A second state machine of the pair of state machines functions to monitor the communication process being performed by the first state machine. Thus, upon completion of the other requested task by the first state machine, a state of the communication process as represented by the second state machine can be referenced as the state from which the communication process should be continued by the first state machine.

It should be appreciated that the present invention can be implemented in numerous ways, including as a process, an apparatus, a system, a device, or a method. Several exemplary embodiments of the invention will now be described in detail with reference to the accompanying drawings.

In the following description, numerous specific details are set forth in order to provide a thorough understanding of the present invention. It will be apparent, however, to one skilled in the art that the present invention may be practiced without some or all of these specific details. In other instances, well known process operations have not been described in detail in order not to unnecessarily obscure the present invention.

Figure 1:
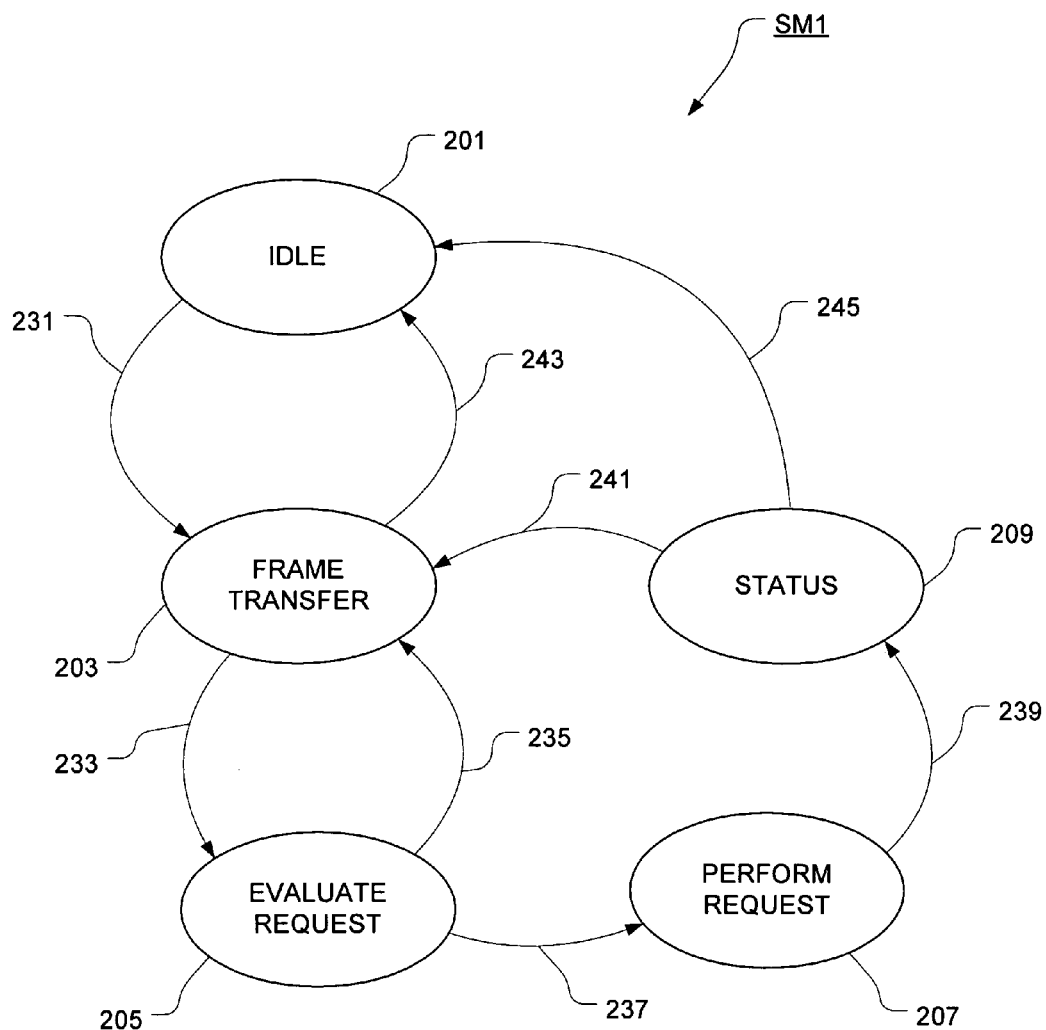
FIG. 1 is an illustration showing a first state machine of a pair of state machines configured to provide standard protocol communication with interrupt capability, in accordance with one embodiment of the present invention.

FIG. 1 is an illustration showing a first state machine (SM1) of a pair of state machines configured to provide standard protocol communication with interrupt capability, in accordance with one embodiment of the present invention. The first state machine (SM1) includes an IDLE state 201 in which the first state machine (SM1) is waiting to start a communication process in accordance with a standard protocol. In one embodiment, the communication process involves a frame transfer operation performed in accordance with a standard protocol. Upon receipt of a signal to start a frame transfer operation, a condition is satisfied causing the first state machine (SM1) to transition from the IDLE state 201 through a branch 231 to a FRAME TRANSFER state 203.

In the FRAME TRANSFER state 203, the first state machine (SM1) operates to perform the frame transfer operation in accordance with the standard protocol. In one embodiment, the first state machine (SM1) is configured to perform the frame transfer operation in accordance with a Serial Advanced Technology Attachment (SATA) protocol. It should be appreciated, however, that the first state machine (SM1) can be configured to perform the frame transfer operation in accordance with essentially any type of communication protocol. Upon completion of the frame transfer operation, a condition is satisfied causing the first state machine (SM1) to transition from the FRAME TRANSFER state 203 through a branch 243 back to the IDLE state 201. While operating in the FRAME TRANSFER state 203, however, the first state machine (SM1) is also configured to accept requests to perform tasks other than those associated with the frame transfer operation.

If a request to perform another task is made while operating in the FRAME TRANSFER state 203, a condition is satisfied causing the first state machine (SM1) to activate an EVALUATE REQUEST state 205 as indicated by a branch 233. While the EVALUATE REQUEST state 205 is active, the first state machine (SM1) continues to perform the frame transfer operation. In the EVALUATE REQUEST state 205, the incoming request to perform the other task is evaluated to determine if the other task has a higher priority than the frame transfer operation being performed. If it is determined that the other task does not have a higher priority than the frame transfer operation being performed, the first state machine (SM1) exits the EVALUATE REQUEST state 205 and returns to the FRAME TRANSFER state 203 as indicated by a branch 235. However, if it is determined that the other task does have a higher priority than the frame transfer operation being performed, the first state machine (SM1) transitions from the EVALUATE REQUEST state 205 through a branch 237 to a PERFORM REQUEST state 207.

In the PERFORM REQUEST state 207, the first state machine (SM1) operates to perform the other task as requested. While operating in the PERFORM REQUEST state 207, the first state machine (SM1) is configured to continue the frame transfer operation up to an instance at which a response is required to be provided by the first state machine (SM1), whereby the frame transfer operation will be held at the instance where the first state machine (SM1) is required to provide a response. The other task to be performed by the first state machine in the PERFORM REQUEST state 207 can be one task or a sequence of tasks. Upon completion of the other tasks, a condition is satisfied causing the first state machine (SM1) to transition from the PERFORM REQUEST state 207 through a branch 239 to a STATUS state 209.

In the STATUS state 209, the first state machine (SM1) inquires with a second state machine (SM2) to determine a status of the frame transfer operation having been underway prior to entering the PERFORM REQUEST state 207. The second state machine (SM2) provides the first state machine (SM1) with the current status of the frame transfer operation. If the frame transfer operation is not yet complete, a condition is satisfied causing the first state machine (SM1) to transition from the STATUS state 209 through a branch 241 to a FRAME TRANSFER state 203, whereby the first state machine (SM1) will continue the frame transfer operation according to the status obtained from the second state machine (SM2). If the second state machine (SM2) indicates that the frame transfer operation is complete (i.e., the second state machine (SM2) is in an IDLE state), a condition is satisfied causing the first state machine (SM1) to transition from the STATUS state 209 through a branch 245 to the IDLE state 201.

Figure 2:
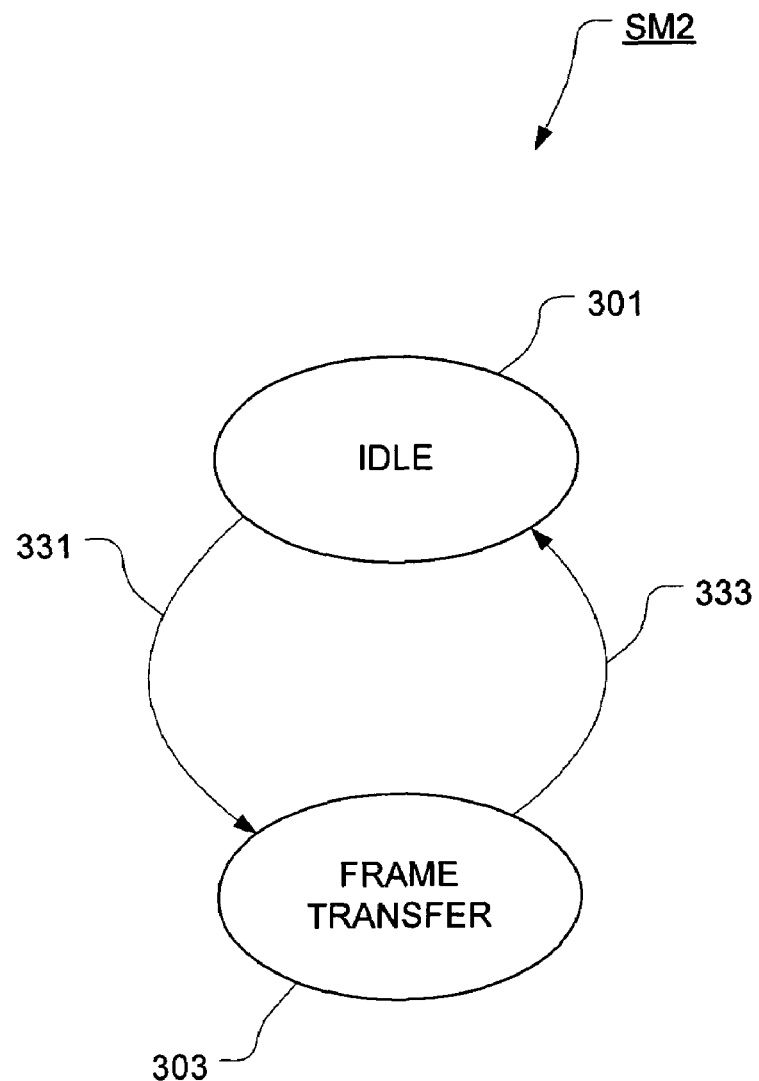
FIG. 2 is an illustration showing the second state machine of the pair of state machines configured to provide standard protocol communication with interrupt capability, in accordance with one embodiment of the present invention.

FIG. 2 is an illustration showing the second state machine (SM2) of the pair of state machines configured to provide standard protocol communication with interrupt capability, in accordance with one embodiment of the present invention. The second state machine (SM2) includes an IDLE state 301 in which the second state machine (SM2) is waiting to start a communication process (i.e., frame transfer operation) in accordance with a standard protocol. As with the first state machine (SM1) of FIG. 1, upon receipt of a signal to start a frame transfer operation, a condition is satisfied causing the second state machine (SM2) to transition from the IDLE state 301 through a branch 331 to a FRAME TRANSFER state 303. It should be appreciated that the second state machine (SM2) transitions from the IDLE state 301 to the FRAME TRANSFER state 303 at essentially the same instance that the first state machine (SM1) of FIG. 1 transitions from the IDLE state 201 to the FRAME TRANSFER state 203.

In the FRAME TRANSFER state 303, the second state machine (SM2) operates to monitor the frame transfer operation being performed by the first state machine (SM1) in the FRAME TRANSFER state 203. Thus, the second state machine (SM2) is configured to follow (i.e., perform) the frame transfer operation in accordance with the same communication protocol followed by the first state machine (SM1) when operating in the FRAME TRANSFER state 203. Simply speaking, while operating in the FRAME TRANSFER state 303, the second state machine (SM2) maintains a duplicate representation of the frame transfer operation condition existing in the first state machine (SM1). Therefore, at any given instance, the second state machine (SM2) can be referenced to identify a status of the frame transfer operation being performed by the first state machine (SM1). In this manner, the second state machine (SM2) provides the status of the frame transfer operation being performed by the first state machine (SM1) when the associated inquiry is made by the first state machine (SM1) in the STATUS state 209. With further reference to the second state machine (SM2), upon completion of the frame transfer operation, a condition is satisfied causing the second state machine (SM2) to transition from the FRAME TRANSFER state 303 through a branch 333 back to the IDLE state 301.

Table 1 provides a descriptive summary of the first state machine (SM1) as described above with respect to FIG. 1. Table 2 provides a descriptive summary of the second state machine (SM2) as described above with respect to FIG. 2.

TABLE 1

| First State Machine (SM1) Descriptive Summary | | |
|---|---|---|
| 201: IDLE | Wait to start frame transfer. | |
| 231: Start frame transfer. | | → 203: FRAME TRANSFER |
| 203: FRAME TRANSFER | Perform frame transfer according to protocol. | |
| 233: Receive request to perform other task. | | → 205: EVALUATE REQUEST |
| 243: Frame transfer complete. | | → IDLE |
| 205: EVALUATE REQUEST | Determine if request is higher priority than frame transfer. | |
| 235: Request is not higher priority than frame transfer. | | → 203: FRAME TRANSFER |
| 237: Request is higher priority than frame transfer. | | → PERFORM REQUEST |
| 207: PERFORM REQUEST | Perform request. | |
| 239: Complete request. | | → 209: STATUS |

TABLE 1-continued

| First State Machine (SM1) Descriptive Summary | | |
|---|---|---|
| 209: STATUS | Obtain current frame transfer status from SM2. | |
| 241: Frame transfer incomplete. | | → 203: FRAME TRANSFER |
| 245: Frame transfer complete. | | → 201: IDLE |

TABLE 2

| Second State Machine (SM2) Descriptive Summary | | |
|---|---|---|
| 301: IDLE | Wait to start frame transfer. | |
| 331: Start frame transfer. | | → 303: FRAME TRANSFER |
| 303: FRAME TRANSFER | Monitor frame transfer of SM1 according to protocol. | |
| 333: Frame transfer complete. | | → 301: IDLE |

Figure 3:
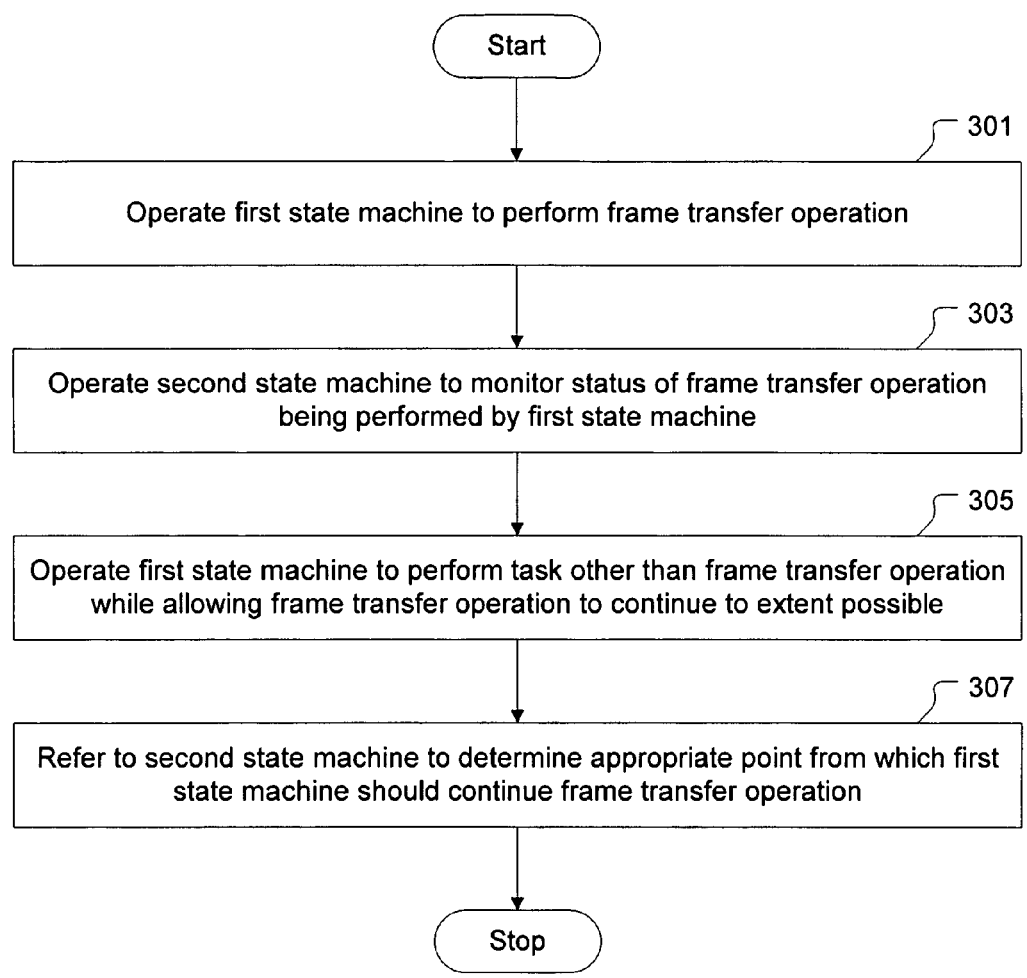
FIG. 3 is an illustration showing a flowchart of a method for operating a device to perform a communication operation in accordance with a standard protocol while providing a communication interrupt capability, in accordance with one embodiment of the present invention.

FIG. 3 is an illustration showing a flowchart of a method for operating a device to perform a communication operation in accordance with a standard protocol while providing a communication interrupt capability, in accordance with one embodiment of the present invention. The communication interrupt capability allows the device to perform a task other than the communication operation without terminating or corrupting the communication operation. Upon completing performance of the other task, the communication operation can successfully resume.

The method of FIG. 3 includes an operation 301 in which a first state machine is operated to perform a frame transfer operation (i.e., the communication operation) in accordance with a standard protocol. In one embodiment, the standard protocol is the SATA protocol. However, other embodiments may use a different standard protocol. The method also includes an operation 303 for operating a second state machine to monitor a status of the frame transfer operation being performed by the first state machine. The second state machine provides a representation of a current status of the frame transfer operation being performed by the first state machine. Therefore, observation of the frame transfer operation state in the second state machine provides a view of the frame transfer operation state in the first state machine.

The method further includes an operation 305 in which the first state machine is operated to perform a task other than the frame transfer operation. In the operation 305, the frame transfer operation is allowed to continue up to a point at which an action is required to be performed by the first state machine. Since the first state machine is occupied performing the other task, the frame transfer operation will hold until the first state machine becomes available to resume the frame transfer operation. Once the first state machine completes the other task and becomes available to resume the frame transfer operation, the method provides an operation 307 for referring to the second state machine to determine an appropriate point from which the first state machine should continue the frame transfer operation.

Figure 4:
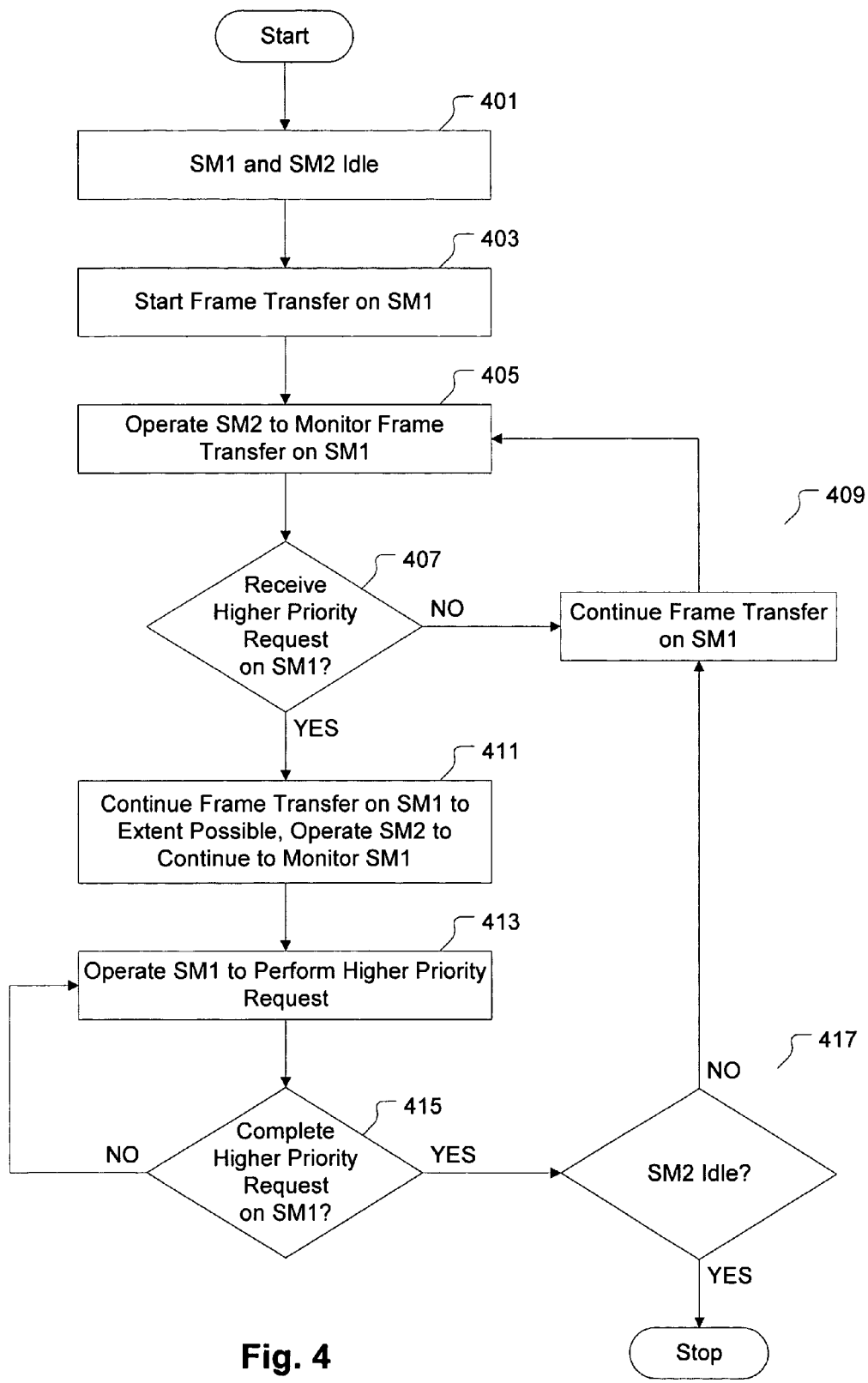
FIG. 4 is an illustration showing a flowchart of a method for operating a pair of state machines configured to provide standard protocol communication with interrupt capability, in accordance with one embodiment of the present invention.

FIG. 4 is an illustration showing a flowchart of a method for operating a pair of state machines configured to provide standard protocol communication with interrupt capability, in accordance with one embodiment of the present invention. The pair of state machines correspond to the first state machine (SM1) and the second state machine (SM2) as previously described with respect to FIGS. 1 and 2, respectively. The method begins at an operation 401 in which both the first state machine (SM1) and the second state machine (SM2) are idle. In an operation 403, a frame transfer operation is started on the first state machine (SM1). An operation 405 immediately follows in which the second state machine (SM2) is operated to monitor the frame transfer operation being performed on the first state machine (SM1).

While performing the frame transfer operation on the first state machine (SM1) and simultaneously monitoring the frame transfer operation on the second state machine (SM2), the method provides an operation 407 for receiving a request to perform another task on the first state machine (SM1). In the operation 407, a determination is made as to whether the other requested task is of higher priority than the frame transfer operation being performed by the first state machine (SM1). If the other requested task is not of higher priority than the frame transfer operation, the other requested task is not performed and the method continues with an operation 409. In the operation 409, the frame transfer operation continues on the first state machine (SM1). Also, from the operation 409, the method loops back the operation 405 in which the second state machine (SM2) is operated to monitor the frame transfer operation being performed on the first state machine (SM1). The loop back to operation 405 also enables the operation 407 to be repeated, thus allowing for receipt of another request to perform another task on the first state machine (SM1).

If the other task as received in the operation 407 is of higher priority than the frame transfer operation, the method continues with an operation 411. In the operation 411, the frame transfer operation being performed by the first state machine (SM1) is continued up to a point that a response is required to be provided by the first state machine (SM1). Also, in the operation 411 the second state machine (SM2) continues to monitor the frame transfer operation being performed by the first state machine (SM1). The method continues with an operation 413 in which the first state machine (SM1) is operated to perform the other task having higher priority than the frame transfer operation.

The method also includes an operation 415 for determining when the other task being performed on the first state machine (SM1) is completed. Upon completion of the other task, the method continues with an operation 417 in which a determination is made as to the status of the frame transfer operation being performed by the first state machine (SM1). In the operation 417, an inquiry is made to determine whether the second state machine (SM2) is idle. Since the second state machine (SM2) is configured to monitor the status of the first state machine (SM1) with respect to the frame transfer operation, a condition of the frame transfer operation in second state machine (SM2) is representative of a condition of the frame transfer operation being performed by the first state machine (SM1). Therefore, if the second state machine (SM2) is idle, the frame transfer operation continued to completion while the first state machine (SM1) was performing the other higher priority task. However, if the second state machine (SM2) is not idle, the frame transfer operation has not yet completed. The non-idle second state machine (SM2) causes the method to proceed with the operation 409 in which the frame transfer operation is continued on the first state machine (SM1). Also, the condition of the frame transfer operation as represented by the second state machine (SM2) is observed by the first state machine (SM1) to identify a point from which the first state machine (SM1) should continue the frame transfer operation.

One skilled in the art will appreciate that the first and second state machines of the present invention can be defined on a semiconductor chip using logic gates configured to provide the functionality as previously discussed. For example, a hardware description language (HDL) can be employed to synthesize hardware and a layout of the logic gates for providing the necessary functionality described herein.

Furthermore, with the above embodiments in mind, it should be understood that the present invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data which can be thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer systems so that the computer readable code is stored and executed in a distributed fashion.

While this invention has been described in terms of several embodiments, it will be appreciated that those skilled in the art upon reading the preceding specifications and studying the drawings will realize various alterations, additions, permutations and equivalents thereof. It is therefore intended that the present invention includes all such alterations, additions, permutations, and equivalents as fall within the true spirit and scope of the invention.

What is claimed is:

1. A circuit for performing device communication, comprising:
    a first state machine defined by circuitry configured to perform device communication, wherein the device communication is a transfer of data in accordance with a standard protocol from one device to another device, the first state machine circuitry being further configured to deviate from the device communication, the first state machine circuitry being further configured to obtain a status of the device communication from another state machine and continue the device communication based on the obtained status of the device communication; and independently from the first state machine
    a second state machine defined by circuitry configured to perform the same device communication to be performed by the first state machine simultaneously with performance of the device communication by the first state machine whereby a condition of the device communication performed by the second state machine represents a condition of the device communication performed by the first state machine, the second state machine circuitry being further configured to provide the status of the device communication to the first state machine.

2. The circuit for performing device communication as recited in claim 1, wherein the first state machine includes circuitry configured to receive a request to perform a task other than the device communication.

3. The circuit for performing device communication as recited in claim 2, wherein the first state machine includes circuitry configured to recognize the task other than the device communication as having a higher priority than the device communication and activate the first state machine circuitry configured to deviate from the device communication.

4. The circuit for performing device communication as recited in claim 1, wherein the first state machine circuitry is configured to, upon activation of the first state machine to deviate from the device communication, continue the device communication up to a state in the device communication at which the first state machine is required to provide a response to continue the device communication.

5. The circuit for performing device communication as recited in claim 1, wherein the device communication follows a Serial Advanced Technology Attachment (SATA) protocol.

6. A method for performing device communication, comprising:
   operating a first state machine to perform a frame transfer operation;
   operating a second state machine separate from the first state machine to perform a frame transfer operation identical to the frame transfer operation being performed by the first state machine and simultaneously with performance of the frame transfer operation by the first state machine, whereby a condition of the frame transfer operation performed by the second state machine represents a condition of the frame transfer operation performed by the first state machine;
   operating the first state machine to perform a task other than the frame transfer operation, the first state machine interrupting its frame transfer operation to perform the other task; and
   referring to the second state machine to determine a current state of the frame transfer operation interrupted by the first state machine, wherein the current state is indicated by the condition of the frame transfer operation performed by the second state machine.

7. The method for performing device communication as recited in claim 6, further comprising:
   operating the first state machine to continue the frame transfer operation from the current state as determined by referring to the second state machine.

8. The method for performing device communication as recited in claim 6, wherein the frame transfer operation is performed in accordance with a Serial Advanced Technology Attachment (SATA) protocol.

9. The method for performing device communication as recited in claim 6, further comprising:
   receiving a request to operate the first state machine to perform the task other than the frame transfer operation.

10. The method for performing device communication as recited in claim 9, further comprising:
    identifying the task other than the frame transfer operation as having a higher priority than the frame transfer operation, the identifying causing the first state machine to be operated to perform the task other than the frame transfer operation.

11. The method for performing device communication as recited in claim 6, further comprising:
    prior to operating the first state machine to interrupt its frame transfer operation, continuing to perform the frame transfer operation up to a state in the frame transfer operation at which the first state machine is required to provide a response to continue its frame transfer operation.

12. A computer readable storage medium containing program instructions for performing device communication, comprising:
    program instructions for operating a first state machine to perform a frame transfer operation;
    program instructions for operating a second state machine separate from the first state machine to perform a frame transfer operation identical to the frame transfer operation being performed by the first state machine and simultaneously with performance of the frame transfer operation performed by the first state machine, whereby a condition of the frame transfer operation performed by the second state machine represents a condition of the frame transfer operation performed by the first state machine;
    program instructions for operating the first state machine to perform a task other than the frame transfer operation, the first state machine interrupting its deviating from the frame transfer operation to perform the other task;
    program instructions for referring to the second state machine to determine a current state of the frame transfer operation interrupted by the first state machine, wherein the current state is indicated by the condition of the frame transfer operation performed by the second state machine.

13. The computer readable storage medium containing program instructions for performing device communication as recited in claim 12, further comprising:
    program instructions for operating the first state machine to continue the frame transfer operation from the current state as determined by referring to the second state machine.

14. The computer readable storage medium containing program instructions for performing device communication as recited in claim 12, wherein the program instructions for operating the first state machine to perform the frame transfer operation include program instruction for performing the frame transfer operation in accordance with a Serial Advanced Technology Attachment (SATA) protocol.

15. The computer readable storage medium containing program instructions for performing device communication as recited in claim 12, further comprising:
    program instructions for receiving a request to operate the first state machine to perform the task other than the frame transfer operation.

16. The computer readable storage medium containing program instructions for performing device communication as recited in claim 15, further comprising:
    program instructions for identifying the task other than the frame transfer operation as having a higher priority than the frame transfer operation, the identifying causing the first state machine to be operated to perform the task other than the frame transfer operation.

17. The computer readable storage medium containing program instructions for performing device communication as recited in claim 12, further comprising:
    program instructions for prior to operating the first state machine to interrupt its frame transfer operation, continuing to perform the frame transfer operation up to a state in the frame transfer operation at which the first state machine is required to provide a response to continue its frame transfer operation.

* * * * *